US010049486B2

(12) United States Patent
Barringer et al.

(10) Patent No.: US 10,049,486 B2
(45) Date of Patent: *Aug. 14, 2018

(54) SPARSE RASTERIZATION

(71) Applicant: Intel Corporation, Santa Clara, CA (US)

(72) Inventors: Rasmus Barringer, Lund (SE); Tomas G. Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/261,892

(22) Filed: Sep. 10, 2016

(65) Prior Publication Data

US 2017/0011543 A1 Jan. 12, 2017

Related U.S. Application Data

(63) Continuation of application No. 14/308,813, filed on Jun. 19, 2014, now Pat. No. 9,501,860.

(60) Provisional application No. 61/923,277, filed on Jan. 3, 2014.

(51) Int. Cl.
*G06T 15/08* (2011.01)
*G06T 15/00* (2011.01)
*G06T 15/60* (2006.01)
*G06T 15/80* (2011.01)

(52) U.S. Cl.
CPC ............ *G06T 15/005* (2013.01); *G06T 15/60* (2013.01); *G06T 15/80* (2013.01)

(58) Field of Classification Search
None
See application file for complete search history.

(56) References Cited

U.S. PATENT DOCUMENTS

| | | | | |
|---|---|---|---|---|
| 6,933,946 B1 * | 8/2005 | Silva | ......................... | G06T 1/60 345/582 |
| 7,287,234 B2 * | 10/2007 | Leah | ...................... | G06T 11/206 345/589 |
| 7,415,671 B2 * | 8/2008 | Sylor | .................. | G06F 11/3006 709/209 |
| 8,189,001 B2 * | 5/2012 | Bakalash | ................ | G06T 15/06 345/419 |
| 2013/0002671 A1 * | 1/2013 | Armsden | ................ | G06T 15/06 345/426 |

OTHER PUBLICATIONS

Clarberg, P., et al., "A Sort-Based Deferred Shading Architecture for Decoupled Sampling," ACM Transactions on Graphics (SIGGRAPH 2013), vol. 32, No. 4, article No. 141, 2013 (10 pages).
Greene, N., et al., Hierarchical Z-buffer visibility, SIGGRAPH 1993, pp. 231-238 (7 pages).
Morein, S., "ATI Radeon HyperZ Technology," Workshop on Graphics Hardware, Hot3D Proceedings, Graphics Hardware, Aug. 2000 (21 pages).

* cited by examiner

*Primary Examiner* — Said Broome
(74) *Attorney, Agent, or Firm* — Trop Pruner & Hu, P.C.

(57) ABSTRACT

An importance map indicates, for each of a plurality of pixels, whether the pixel is considered important enough to be rendered. A hierarchical tree for pixels is created to generate a hierarchical importance map. The hierarchical importance map may be used to stop traversal of a primitive that does not overlap a pixel indicated to be important.

21 Claims, 6 Drawing Sheets

SPARSE RASTERIZATION

CROSS-REFERENCE TO RELATED APPLICATIONS

This is a continuation application claiming priority to non-provisional U.S. patent application Ser. No. 14/308,813 filed on Jun. 19, 2014, based on provisional application Ser. No. 61/923,277 filed Jan. 3, 2014, hereby expressly incorporated by reference herein.

BACKGROUND

When rendering an image of a three-dimensional scene, a dense rectangular image is usually generated. A stencil buffer masks away pixels during rendering. When the mask contains a very sparse set of pixels, fragment shading efficiency is typically reduced due to quad shading overhead. Shading quads are blocks of 2×2 pixels. Redundant processing occurs along edges where there is partial coverage because only some of the pixels contribute to the final image.

BRIEF DESCRIPTION OF THE DRAWINGS

Some embodiments are described with respect to the following figures.

DETAILED DESCRIPTION

An importance map indicates, for each of a plurality of pixels, whether the pixel is considered important enough to be rendered. A hierarchical tree for pixels in the map is used to generate a hierarchical importance map. The hierarchical importance map may be used to stop traversal of a primitive that does not overlap a pixel indicated to be important.

In accordance with some embodiments, a rendering pipeline allows for arbitrary portions of an image to be generated more efficiently. Use cases include rendering certain lines in an image such as silhouettes and applying fine grained masks.

In sparse rasterization, for each pixel, a list of triangles is found that may possibly affect the final pixel color. In theory, sparse rasterization is a process where a triangle is traversed against a hierarchical tree of a hierarchical importance map. Traversal continues down into a child node if the triangle overlaps the spatial extent of the child node, and the corresponding bit in the hierarchical importance map is set to indicate that there is at least one important pixel in the subtree of the child node. The hierarchical tree may be built only once and used for the remainder of the process. The data structure represents a sparse set of pixels in particular need of anti-aliasing and so there is no strict front-to-back traversal of all triangles in some embodiments.

First, a sparse set of important pixels is created. This set may include pixels with geometric silhouette edges, discontinuities in the frame buffer, and pixels/polygons under user-guided artistic control. After that, the sparse rasterizer and fragment shader (which is parallel and single instruction multiple data adapted in one embodiment) directly accesses shared resources (e.g., render targets created by the graphics processing unit (GPU)). This system can render a scene with shadow mapping with adaptive anti-aliasing with 16 samples per important pixel faster than the GPU with 8 samples per pixel using multi-sampling anti-aliasing in some embodiments.

Figure 1:
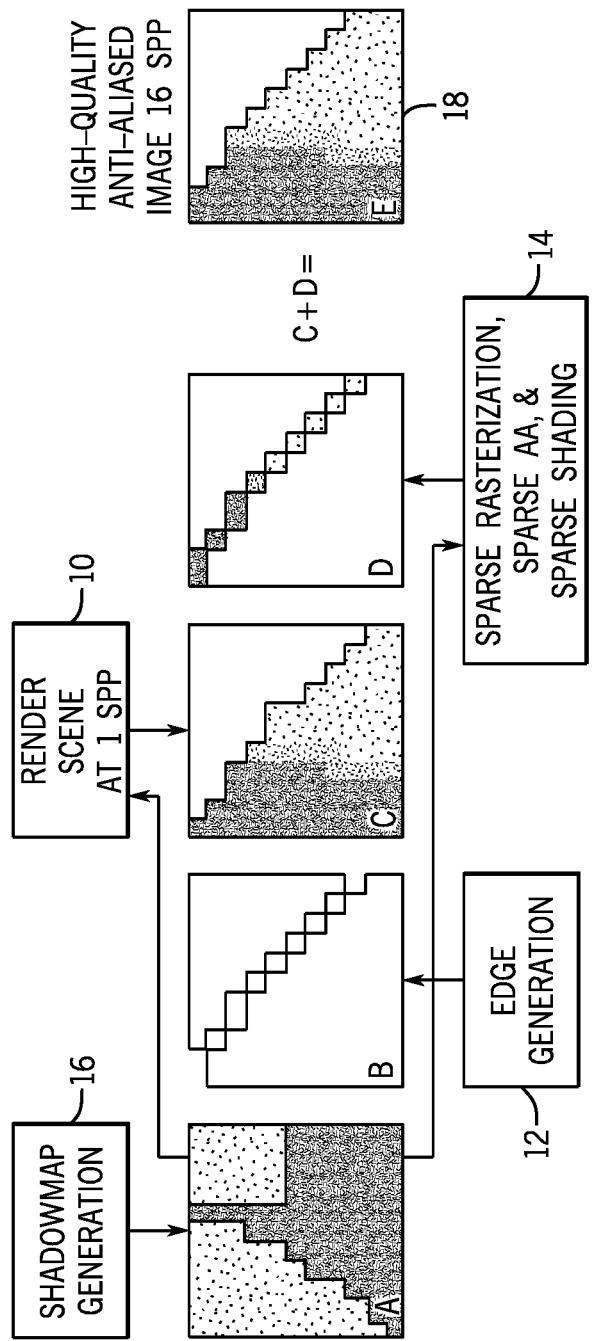
FIG. 1 is a flow chart for anti-aliasing according to one embodiment.

The system, shown in FIG. 1, generates high-quality edge anti-aliasing. Two render targets are rendered at 10 with one sample per pixel (spp)—a shadow map generated at 16 and a rendering of the scene using the shadow map at 10. In addition, the algorithm generates edges at 12 and performs sparse rasterization, anti-aliasing (AA), and shading at 14 for the edge pixels in the scene (but not in the shadow map). All the squares in the middle are located in shared memory, and the passes at the top are executed by the GPU, and the passes at the bottom are executed on the CPU, and together they generate a high-quality anti-aliased image 18 with 16 spp for the edges in one embodiment.

In one embodiment, an algorithm is divided into two parts, where one is executed on the graphics processing unit (GPU), and the other on the CPU cores. The idea is to take any application (e.g., a game), and render the entire scene, as usual on the GPU, using a graphics pipeline, such as OpenGL or DirectX, at one sample per pixel (spp). The fragment shaders used for rendering can include all conventional rendering techniques, such as local illumination, texture mapping, environment mapping, screen space ambient occlusion, G-buffer passes for deferred rendering, light accumulation, shadow mapping, shadow volumes, etc.

Most rendering engines use several passes, where each pass may generate one or more render targets (RTs). The user of the algorithm can choose to apply high-quality anti-aliasing to any subset of the render targets, called high-quality render targets (HQRTs). First, the algorithm renders to the RTs and the HQRTs as usual using the GPU with one spp, and then let the CPU refine the pixels, in the HQRTs, that are in need of high-quality anti-aliasing.

While the GPU is no more occupied than usual, an adaptive anti-aliasing algorithm may be run asynchronously on the CPU cores for the HQRTs. The CPU rendering pipeline includes three stages, namely, i) silhouette edge detection, ii) sparse rasterization, and iii) sparse anti-aliasing. The number of pixels containing silhouette edges in an image is relatively small and more expensive, higher-quality anti-aliasing will be applied to only this sparse set of important pixels. The fragment shading for the sparse set of pixels is done on the CPU, where the render targets are accessed via shared memory. This makes our CPU shading extremely efficient. Finally, the high-quality versions of the sparse set of important pixels are written back to the HQRT, also located in shared memory.

It is often sufficient to let only the final render pass (before any post-processing techniques, such as tone mapping, etc, are applied) render to an HQRT and let all other render targets be rendered at one spp on the GPU. This makes the impact of the algorithm very small in some embodiments.

Figure 2:
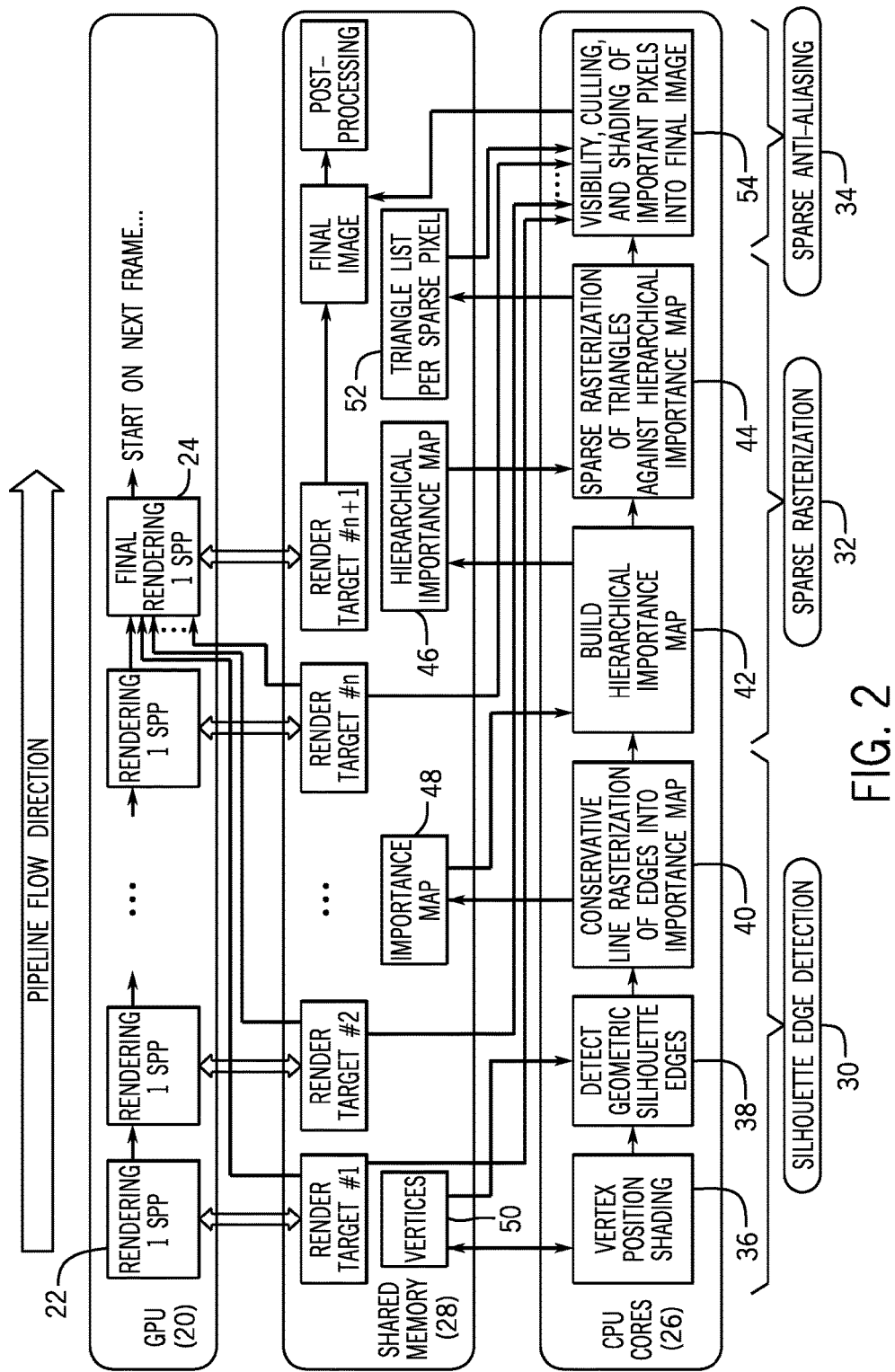
FIG. 2 is a flow chart for a graphics pipeline according to one embodiment.

An illustration of such a setup is shown in FIG. 2, where the final render pass uses an HQRT. In this setup, the fragment shader in the final render pass also accesses all previously generated render targets. Note that this is just an example—there are essentially an endless number of possible variations.

The sequence shown in FIG. 2 may be implemented in software, firmware and/or hardware. In software and firmware embodiments it may be implemented by computer executed instructions stored in one or more non-transitory computer readable media such as magnetic, optical or semiconductor storages. For example the sequence may be stored in a shared memory between a graphics processing unit and a central processing unit, or in another embodiment, parts of the sequence may be stored in computer readable instructions on the graphics processing unit and the central processing unit.

In FIG. 2, assume that n render targets 22, with one sample per pixel (spp), are rendered by the GPU 20, and that for the final rendering on the GPU, all render targets are read and used in the fragment shader for the final image 24. One or more post-processing passes may follow. The work of the GPU is shown at the top, the work done by the CPU cores 26 is shown at the bottom, and the shared memory 28, which glues together the work done by the CPU and the GPU, is shown in the middle. Note that the CPU rendering pipeline consists of three stages, namely, silhouette edge detection 30, sparse rasterization 32, and sparse anti-aliasing 34. The CPU pipeline works on a sparse set of important pixels (see FIG. 1) that are in need of higher-quality anti-aliasing. The algorithm can exploit the render targets created rapidly by the GPU, and sparsely read from these render targets directly from the CPU, thereby avoiding the often expensive copy from GPU to CPU. In the same way, the CPU can update a sparse set of pixels directly into the final image since the memory is shared in some embodiments.

The task of the GPU is simply to render all RTs and all HQRTs as usual with only 1 spp. The RTs and HQRTs may be accessed from the fragment shader running sparsely on the CPU, and in addition, the HQRTs will be updated sparsely with high-quality anti-aliased pixels. Hence, the RTs and HQRTs may be shared between the CPU and the GPU. In the worst case, sharing resources means copying data from the GPU to the CPU every frame, and in the best case, it simply means reading from the same memory pointer as the GPU pipeline uses. The latter is a reality when working with a shared memory architecture with an integrated graphics processor. Therefore, the algorithm may be designed around an architecture that can share the address space between the CPU and the GPU in one embodiment.

Even without shared memory, a duplication of static vertex buffers and textures generally works well. However, rendering gets substantially less efficient when there is a frequent use of render targets.

The rendering pipeline detects a sparse set of important pixels (such as those that contain geometrical silhouette edges), and then sparsely applies a high-quality anti-aliasing algorithm to only these pixels. The CPU pipeline may be heavily optimized for rasterizing triangles to this sparse set of important pixels. The three stages of a CPU rendering pipeline are silhouette edge detection, sparse rasterization, and sparse anti-aliasing, and these stages are executed for all HQRTs.

Similar to the GPU pipeline, the input to the pipeline is organized into draw calls. Each draw call contains information about a group of vertices with the same format and rendering state, connected into triangles by an implicit relationship, or explicitly by a list of indices.

Here, a straightforward silhouette edge detection mechanism, illustrated by the boxes 36, 38 and 40 at the bottom in FIG. 2, is used in one embodiment. First, the clip-space positions for all vertices are computed as indicated in block 36. One may avoid computing other per-vertex attributes, and defer them until they are possibly needed. The vertex attributes are only computed sparsely for the vertices 50 that are accessed. Next, the triangle edges are tested to determine whether they are geometrical silhouette edges as indicated at block 38. The usual convention is to treat an edge as a silhouette if the edge is shared by one front-facing and one back-facing triangle for closed models, or if the triangle edge is only connected to a single front-facing triangle. As a side effect, edges are marked as silhouettes whenever there is a difference in attributes on the edge, since the vertices are then distinct in the vertex buffer. For example, all edges of the quadrilaterals of a cube will be marked as silhouettes because the normals of the quadrilaterals differ.

All silhouette edges are then clipped against the canonical clip-space volume. The silhouette edges, which possibly have been clipped, are then conservatively rasterized at 40 into an image, called the importance map, with the same resolution as the HQRT. The term "important" indicates that a more sophisticated anti-aliasing algorithm should be applied to those pixels. Hence, it suffices to use a single bit per pixel in the importance map, where zero indicates no further need of anti-aliasing.

Although geometrical silhouette edges are unable to capture aliasing from intersecting triangles, an extension can allow additional important pixels to be specified from discontinuities in the color buffer where there is no discontinuity in depth. Another possibility is to allow an artist to paint importance on objects and rasterize those to the importance map. Yet another is simply to mark an entire triangle or object as important. This may be useful when the sampling rate needs to be locally higher for an entire object. These additions to the importance map are termed "manual additions." Manual additions represent a special case because some optimizations cannot be applied when performing shading culling. In particular, one cannot assume that there are no intersecting triangles that are in need of AA.

The sparse rasterizer, corresponding to the blocks 42 and 44 at the bottom in FIG. 2, works as follows. Early rejection of candidate triangles is advantageous in one embodiment of a rasterizer.

The sparse rasterization stage commences by creating a hierarchical tree (e.g., a quadtree) of the importance map 48 from the edge detection phase, as indicated at block 42. The importance map may contain one bit per pixel, and the bit may be set to one if there is at least one silhouette edge overlapping the pixel. The resulting hierarchical tree is called a hierarchical importance map (HIM) 46, which is a full tree since the input is the entire image. The HIM will be used in the sparse rasterizer 44 to stop traversal if a triangle does not overlap any pixels that are important. The bit of a parent is set to one if at least one child's bit is one.

Figure 3:
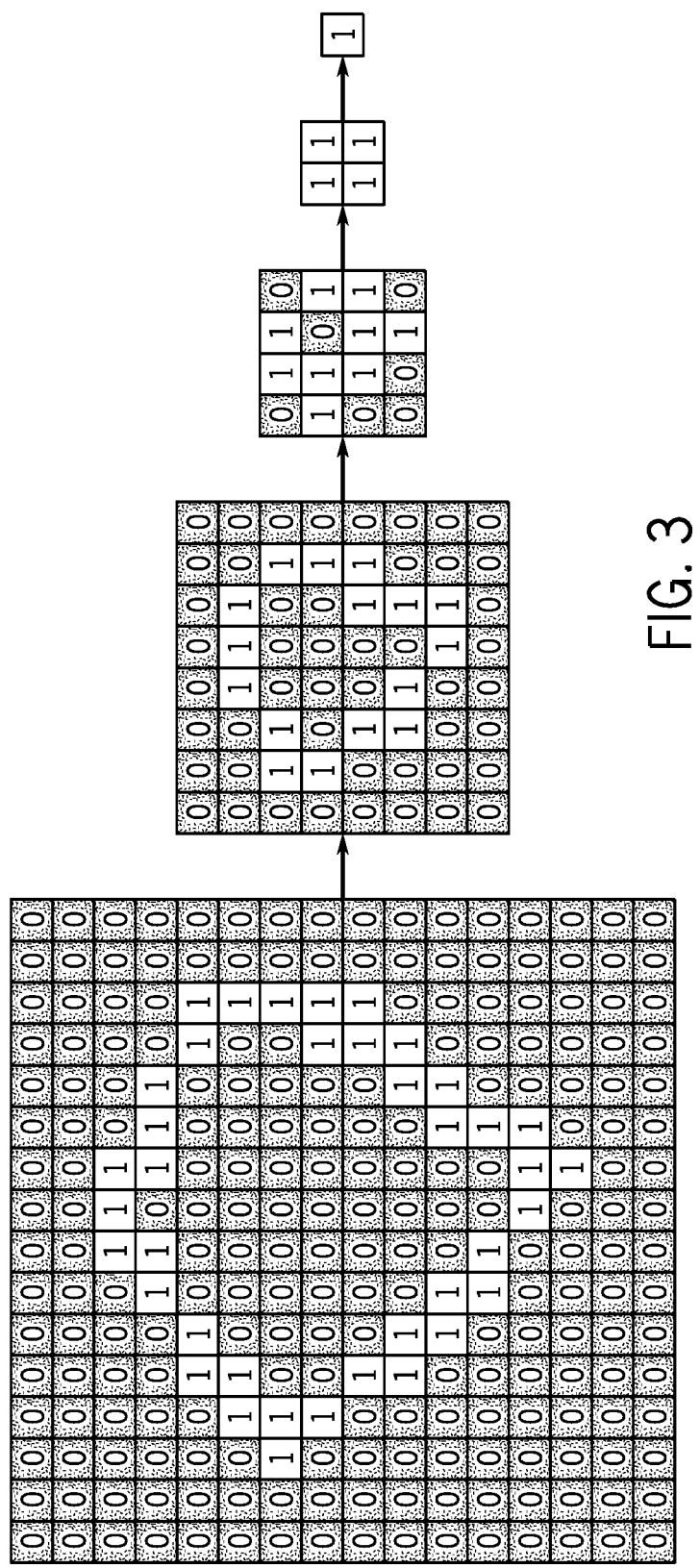
FIG. 3 is a depiction of tree construction according to one embodiment.

An example is shown in FIG. 3. A quadtree is one option, but any hierarchical tree would work. In this case a quad is 2×2 and if any pixel in the 16×16 map in a quad is one, then a one is set in 8×8 map and so on. Each bit in a parent is the logical OR of all of the children's bits. A quadtree includes a number of internal nodes that each have exactly four children. A quadtree may be used to repeatedly divide a planar space into four quadrants or regions. The regions may be square, rectangular or may have arbitrary shape and each leaf node contains data corresponding to one of the four sub-regions that a region is divided into. Thus each node in the tree has four children and a leaf node has no children.

Thus in FIG. 3 the map on the left is the child of the map to the right because each bit in the parent (to the right of the larger map on the left) is the logical OR of all the children's bits. Then the third map, extending left to right, is the parent of the second map extending from left to right and so on. Thus, the fifth map in FIG. 3 is the original parent and the first map, from left to right in FIG. 3, is leaf node.

The input from the edge detection phase is an importance map (FIG. 3 left), with one bit per pixel indicating whether there is at least one silhouette edge overlapping the pixel. Here, the resolution is 16×16, but in reality, it may be 2048×1024, for example. Tree construction is done bottom up (illustrated as left to right in FIG. 3). The bit of a parent is the logical OR of all children's bits.

The sparse rasterization algorithm 44 (FIG. 2) finds, for each pixel, a list of triangles that may possibly affect the final pixel color. It does not suffice to loop over triangles with silhouette edges, because a triangle without a silhouette edge may still be visible within an important pixel, and can therefore affect the final color of the pixel. A typical example is a background triangle, and a silhouette edge cutting through a pixel. Therefore, all triangles are rasterized against the HIM in this stage.

In theory, sparse rasterization is simply a process where a triangle is traversed against the hierarchical tree of the HIM. Traversal continues down into a child node if the triangle overlaps with the spatial extents of the child node, and the corresponding bit in the HIM is set to one, i.e., there is at least one important pixel in the subtree of the child node. The overlap test between a quad and a triangle can be done with an efficient tile test using only additions.

In the following, the term "tile" denotes a $2^n \times 2^n$ region of pixels, where $n \geq 0$, and n can be adjusted for different performance trade-offs. When a node, whose size is equal to the tile size, is reached during traversal, a pointer to that triangle is added to the tile's triangle list 52 (FIG. 2) so that the sparse anti-aliasing procedure knows which triangles to process in the important pixels. This means that a triangle list will be created for each tile, and these triangles are a superset of the triangles that may affect the final color of the pixels in that tile. In practice, the entire traversal can be done in a more efficient manner, depending on the target architecture.

Occlusion culling is very important to performance. An approach similar to $z_{max}$-culling used in graphics processors may use conservative tests. For each tile, a $z_{max}^{tile}$-value is first initialized to infinity. If an opaque triangle is processed, and it covers the entire tile, the triangle's maximum depth, $z_{max}^{tri}$, inside the tile is computed as the maximum of the triangle depths at the four corners of the tile. If $z_{max}^{tri} < z_{max}^{tile}$ then the maximum depth of the tile is updated: $z_{max}^{tile} = z_{max}^{tri}$. Note that all triangles behind $z_{max}^{tile}$ can be safely culled for opaque geometry. For all triangles that are processed during sparse rasterization, $z_{min}^{tri}$-value is also computed as follows. The $z_{min}^{verts}$ is computed as the minimum of the triangle vertices, and the $z_{min}^{corner}$ is computed as the minimum of the depths of the triangle plane at the four corners of the tile. A tight, conservative estimation of the minimum depth of the triangle in that tile is then $z_{min}^{tri} = \max(z_{min}^{verts}, z_{min}^{corner})$. This $z_{min}^{tri}$ value is stored with the triangle for that tile. All incoming triangles are culled against the current $z_{max}^{tile}$, i.e., if $z_{min}^{tri} > z_{max}^{tile}$ then the triangle is not added to the triangle list of the tile. However, the quadtree is built once and used for the remainder of the process. In addition, the data structure represents a sparse set of pixels in need of anti-aliasing, and a strict front-to-back traversal of all triangles is not necessary in some embodiments.

Sparse visibility computations, culling, and shading are done (block 54 in FIG. 2). The purpose of this stage is to efficiently resolve visibility among the triangles of a tile and ultimately calculate the color of each important pixel within. All triangles within a tile are processed in submission order. This stage defines sequence points where the blend mode, z-mode, or other pixel back-end state changes. All triangles contained within the same sequence points are treated as a continuous triangle sequence, even if triangles belong to different draw calls.

One approach to high-quality anti-aliasing is adaptive multi-sampled anti-aliasing (MSAA), where several visibility samples are used per pixel and triangle, but only a single shading sample. In one embodiment, 16 visibility samples per pixel may be sufficient for most scenes, but this can be specified on a per-pixel level, and can even vary across the image. First, inside testing is performed against the edge equations of a triangle, and for each visible sample, a depth value is computed and a triangle pointer is stored.

Shading is delayed to a point where it is absolutely necessary, generally reducing the amount of shading performed. In the case of opaque geometry, the resolve defers shading within the tile until a triangle sequence with a transparent blend mode starts, or until all triangles within the tile have been processed. In the case of transparent geometry, fragments are shaded for a small group of triangles at a time, e.g., 4 or 8. They are then blended with the tile's samples in submission order.

Depending on the rendering state of the triangle sequence, different optimizations can be applied. In the common case, where a triangle sequence represents opaque geometry with depth testing enabled, all optimizations are active. First, all triangles whose $z_{min}^{tri} > z_{max}^{tile}$ are removed from the triangle list of the tile. The remaining triangles are reordered to maximize occlusion culling within each pixel. In one implementation, the triangles are sorted based on $z_{min}^{tri}$.

To allow for occlusion culling at the pixel level, a $z_{max}^{pixel}$-value, representing the maximum depth of the samples in a pixel, is maintained. Once all samples in the pixel have been covered by opaque geometry, the value is used for occlusion culling. When a triangle in a triangle sequence is found with $z_{min}^{tri} > z_{max}^{pixel}$, the rest of the triangle sequence can be discarded since the triangles are sorted along $z_{min}^{tri}$. This scheme allows for efficient occlusion culling even when using highly tessellated models.

For opaque geometry, there are also a number of methods to avoid unnecessary shading, and hence can be viewed as shading culling techniques. For example, if a single fragment is to be shaded for an important pixel, CPU shading is omitted since it would result in the same shading as already generated by the GPU. As a consequence, the pixel is discarded. Similarly, if there are two fragments that belong to two front-facing triangles sharing an edge, which obviously is not a silhouette edge, the corresponding important pixel is discarded. Finally, if there are multiple fragments, but none of the fragments belong to a triangle with a silhouette edge, then there cannot be any visible silhouette edge within the pixel. Hence, the important pixel is discarded. The last optimization assumes that there are no intersecting triangles in need of AA. Therefore, it cannot be applied if the important pixel is a manual addition.

There is a small risk of increased aliasing when the optimizations from the previous paragraph are used. Since fragments are created from discrete samples, there is a possibility that a small triangle ends up between samples when our algorithm is used. The GPU pipeline, on the other hand, might sample this small triangle, and hence produce an aliased pixel, which is different from the resulting pixel from our high-quality rasterizer. The risk of this happening can be reduced to numerical differences by specifying one of the sample points to coincide with the sample location used by the GPU. However, this issue is ultimately a sampling problem that can be solved by increasing the sample rate of the CPU pipeline.

Self-contained fragment shaders, such as those using static textures and uniforms, are trivial to implement in the CPU pipeline. More advanced shaders, in particular those that use render targets (RTs), may require a more elaborate solution, depending on the underlying architecture. When memory is shared between the GPU and the CPU, RTs (created by the GPU pipeline) are directly accessible to the CPU pipeline. However, when the CPU and the GPU are separated by a relatively slow memory bus, issuing transfers of all RTs from the GPU to the CPU each frame, is prohibitively expensive. One solution is to evaluate RTs lazily when they are accessed by a CPU shader. However, even though the evaluation becomes sparse, it would become expensive with many RTs. It is also unclear how lazy evaluation could be implemented in a feed-forward rasterizer. For these reasons, shared memory architectures may be advantageous in some embodiments.

When possible, shading is performed for all deferred samples within the tile simultaneously. This enables single instruction multiple data (SIMD) execution over fragments from different important pixels and will thus have better efficiency than traditional quad rendering in the sparse setup. Initially, the samples within each pixel are compacted into per-pixel per-triangle fragments with a sample mask. These fragments are then sorted based on draw call, triangle, and pixel, in that order. All fragments belonging to the same draw call are processed simultaneously so that a single shader invocation can be performed for all draw call fragments. First, all vertex attributes for the draw call triangles are fetched into an input buffer. Then, all attributes are shaded using a single attribute shader invocation. Note that the attributes for each triangle are shaded exactly once within a tile. The resulting shaded attributes are then interpolated to the individual fragments. Finally, the interpolated attributes are used as input to a single fragment shader invocation that calculates the color of each fragment. The resulting colors are then distributed to the individual samples and they are marked as shaded.

Figure 4:
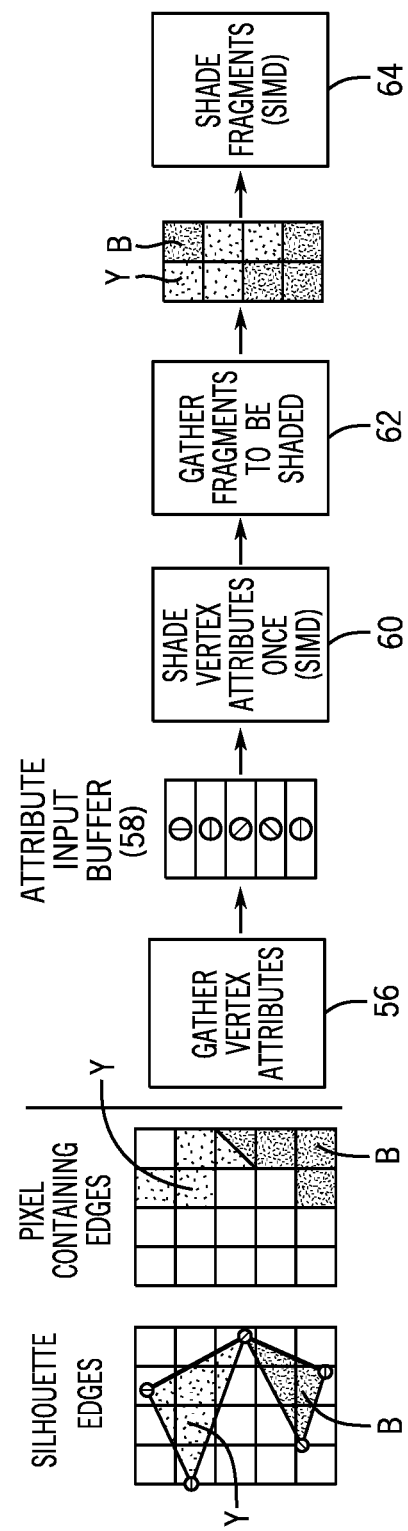
FIG. 4 is a flow chart for a shading pipeline according to one embodiment.

An example of a shading pipeline is shown in FIG. 4. When all triangles have been processed in a tile, the final pixel color is computed as the mean of all the samples' color, which is the last step of the pipeline.

The sequence shown in FIG. 4 may be implemented in software, firmware and/or hardware. In software and firmware embodiments it may be implemented by computer executed instructions stored in one or more non-transitory computer readable media such as magnetic, optical or semiconductor storages.

In one embodiment it may be implemented by a graphics processor.

FIG. 4, on the left shows, for two triangles belonging to the same draw call request, that some fragments be shaded since they have silhouette edges in several pixels. Note that one pixel needs to shade both the Y and B triangles. On the right in FIG. 4, is the shading pipeline. First, the vertex attributes are gathered (block 56) into an input buffer 58, and then these are shaded in parallel using SIMD execution (block 60). Next, the fragments to be shaded are gathered (block 62), and finally, these fragments are shaded (which includes attribute interpolation) (block 64). Note that in reality, more triangles are usually present. For example, one triangle (not shown) would usually exist between the B and Y triangle.

A common way to compute attribute derivatives for, e.g., texture mip map selection, is to render quad fragments and estimate the derivatives as the differences between the samples. This would be very inefficient when rendering a sparse set of pixels. Therefore, analytical derivatives of the barycentric coordinates may be employed in one embodiment. These derivatives can simply replace the ordinary barycentric coordinates for attributes that are to be differentiated, rather than interpolated, before fragment shading. One issue that this fails to deal with is derivatives of indirect texture lookups. In this case, multiple lookups may be done inside the fragment shader in order to perform the differentiation explicitly.

Implementation may be independent of an architecture's SIMD width and simply process more data in Struct of Arrays (SoA) fashion. This means that the same algorithm can use either 4-wide streaming SIMD extensions (SSE) or 8-wide advanced vector extensions (AVX), as well as future SIMD widths, without much adjustment. The inputs to the pipeline, such as vertex buffers, contain regular Array of Structs (AoS) data. Therefore one may make frequent use of register transpose to convert loaded AoS data to SoA form.

The pipeline makes use of a rasterizer based on two-dimensional edge equations from projected and grid-snapped vertices. While this makes it possible to perform rasterization using fixed point math, advanced vector extensions (AVX) floating point computations may be used for efficiency. This is fine as long as all floating point values are within ranges that guarantee an exact result. For example, a 32-bit IEEE 754 floating point value can represent a 24-bit fixed point value exactly (not counting the sign bit).

In order to distribute work among multiple CPU cores, the pipeline splits the different stages into various tasks that are consumed by a pool of worker threads. The main thread can queue multiple independent tasks for processing. Each task has a number of work items that represent the basic unit of work distributed to the worker threads. The work items in each task have a global order; the first work item of the second task is numbered immediately after the last work item of the first task. This allows all worker threads to acquire their work in a lock-free fashion by using an atomic increment of a shared counter. Each task can spawn new tasks when finished and can thus implement dependency chains. The main thread have the ability to wait for all tasks to finish in order to synchronize different stages.

The vertex position shading stage is trivially implemented by processing multiple vertices simultaneously in SIMD fashion. Each task consists of a single draw call, and each work item consists of a subset of vertices to shade. Once a vertex shading task completes, it immediately queues a task for performing triangle setup for each triangle. Triangle setup tests for trivial rejection against the view frustum, performs clipping, snaps its vertices to a two-dimensional grid, determines its facing, computes a bounding box, and sets up edge equations. The facing information is used to speed up the silhouette detector, which follows in the dependency chain.

The silhouette detection task checks front facing triangles for silhouettes by testing the facing of adjacent triangles. The resulting silhouette edges are clipped against the view frustum and conservatively rasterized to the importance map. In order to avoid the synchronization necessary to set individual bits in the importance map, each entry is instead byte sized. Note that vertex shading, triangle setup, and silhouette detection are performed independently for all draw calls without any synchronization. Before starting the next stage, the main thread waits for all outstanding tasks to finish. Once all draw calls have been shaded, and all silhouettes have been rasterized to the importance map, the HIM is built. First, a task that builds tiled subsets of the HIM is executed in parallel. Then a single thread builds the highest levels of the tree over the generated tiles. The HIM is used when binning triangles in the next stage.

The sparse rasterization stage creates one task for each draw call, where a subset of a draw call's triangles are processed in each work item. Each work item reads 4 or 8 front facing triangles at a time, depending on the SIMD width of the CPU, and stores them in vector registers in SoA form. Active triangles are indicated by a lane mask, which is updated as triangles get rejected. A bounding box is then computed around the active triangles, in order to allow for an immediate jump to the lowest possible level in the HIM. This is done efficiently as int lvl=32−clz (max(bbw−1, bbh−1)), where bbw and bbh are the bounding box width and height, respectively, and clz ( ) is an instruction that counts the number of leading zeros. Note that level 0 is the highest level in the HIM. All active triangles are then simultaneously traversed against the HIM, while maintaining active triangles in the lane mask. When the tile level is reached, $z_{min}^{tri}$ and $z_{max}^{tri}$ are computed and all triangles, which are currently active in the lane mask, are written to the tile's triangle list, after testing for occlusion. In order to avoid synchronization, each thread has its own per-tile triangle list.

Once all triangles have been binned to tiles, the sparse anti-aliasing stage creates a single task with work items corresponding to a tile each. Each work item starts by reserving and clearing samples for all important pixels within the tile. Then, the draw call triangles overlapping the tile are read in submission order, by pick sorting from the per-thread triangle lists created in the previous stage. Once a whole triangle sequence have been read, and possibly reordered, the triangles are sample tested. First, the edge equations for a SIMD width of triangles are read. Then, a lookup table, containing the result of evaluating the edge equations at the local sample positions, is set up in order to accelerate the sample tests. For each important pixel, all loaded triangles are conservatively tested against the pixel extents in parallel. Then, each triangle, possibly overlapping the pixel, is sample tested one at a time. Inside and depth testing is performed at the sample locations using the previously computed lookup table, offset by the edge equations evaluated at the pixel. This is done in parallel over samples. Note that since the CPU cores work in parallel with the graphics processor, the AA algorithm does not increase the frame latency, which is a highly desired feature in some embodiments.

It is possible to apply the algorithm to only as many important pixels as there is time before the target frame time has been reached. In one embodiment, for eye tracking, the sampling rate may only be increased in the gaze regions, for faster rendering.

Most GPU research has focused on discrete graphics cards, but shared memory architectures open up for a wide range of novel rendering algorithms. The system can be seen as a starting point for a more general platform for hybrid rendering. The sampling rate may be increased adaptively when a small triangle is missed inside a pixel. Furthermore, analytical and semi-analytical methods may be incorporated into the renderer. It may be possible to develop an analytical method that handles 2-4 triangles per pixel, and then revert to MSAA for more triangles.

Figure 5:
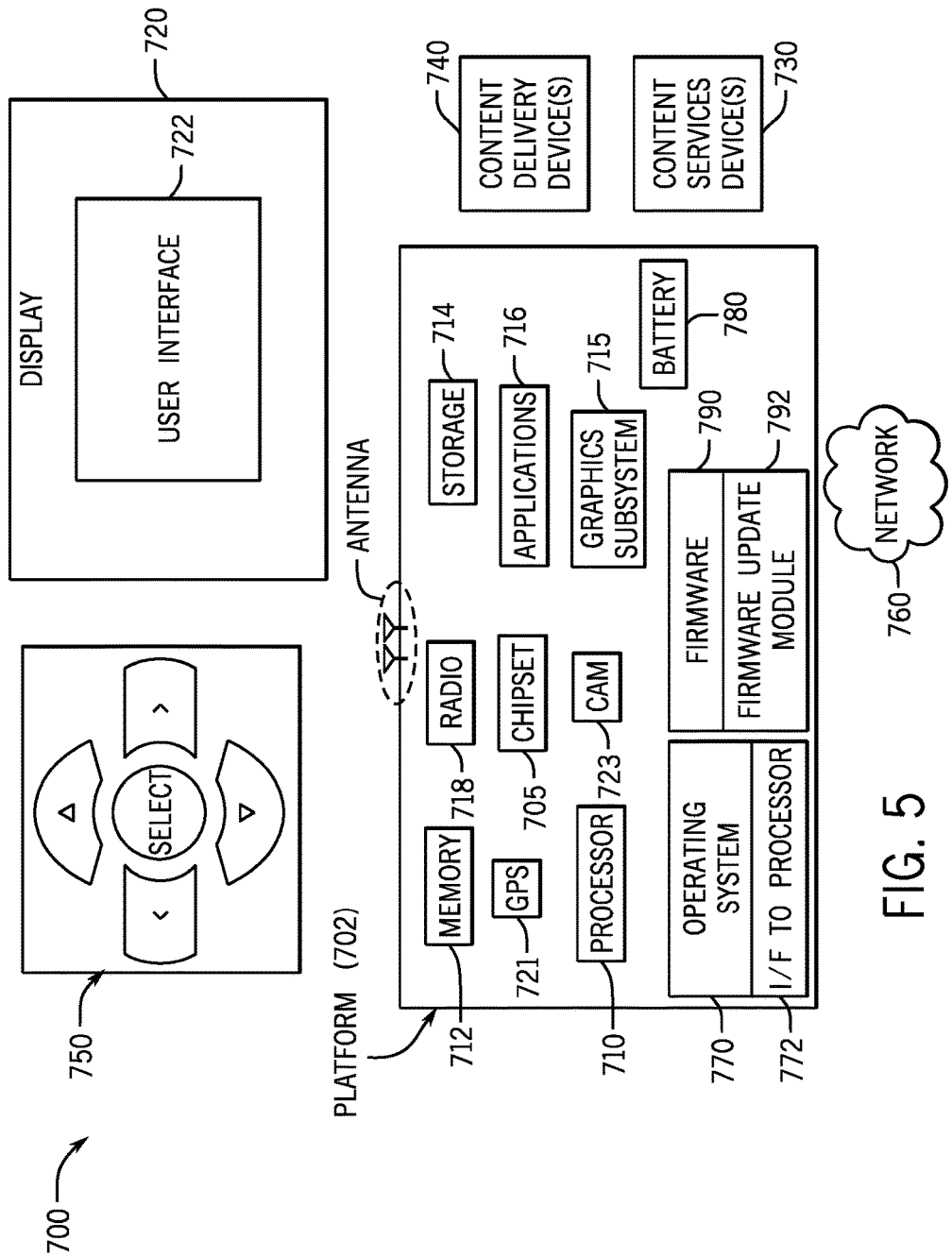
FIG. 5 is a system depiction for one embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 1, 2 and 4 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
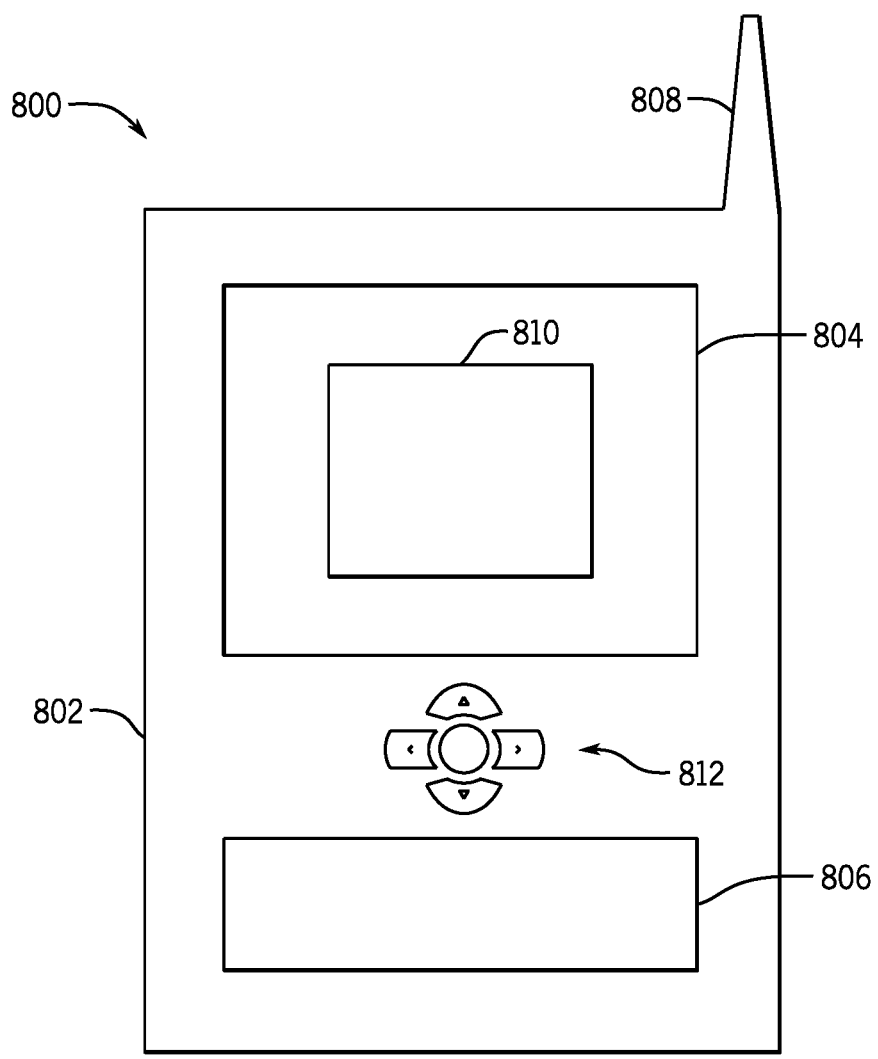
FIG. 6 is a front elevational view of a system according to one embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The following clauses and/or examples pertain to further embodiments:

One example embodiment may be a method comprising developing an importance map to indicate, for each of a plurality of pixels, whether the pixel is considered important enough to be rendered, creating a hierarchical tree for pixels in the map to generate a hierarchical importance map, and using the hierarchical importance map to stop traversal of a primitive that does not overlap a pixel indicated to be important. The method may also include finding, for a tile of pixels, a list of primitives that could affect the color of those pixels in the tile indicated to be important. The method may also include traversing primitives against the hierarchical tree of the hierarchical importance map. The method may also include traversing to a child node if the primitive overlaps a spatial extent of a child node. The method may also include indicating whether there is at least one important pixel in a sub-tree of the child node. The method may also include wherein overlapping is determined using only addition operations. The method may also include creating a list of primitives overlapped for each tile. The method may also include when a leaf node is reached when traversing, storing a pointer to that primitive in the tile's primitive list. The method may also include using occlusion culling to reduce the number of primitives per tile. The method may also include processing all deferred samples within a tile simultaneously. The method may also include sorting deferred samples based on draw call, primitive and pixel. The method may also include processing fragments within a draw call using single instruction multiple data execution.

Another example embodiment may be one or more non-transitory computer readable media storing instructions executed by a processor to perform a sequence comprising developing an importance map to indicate, for each of a plurality of pixels, whether the pixel is considered important enough to be rendered, creating a hierarchical tree for pixels in the map to generate a hierarchical importance map, and using the hierarchical importance map to stop traversal of a primitive that does not overlap a pixel indicated to be important. The media may include said sequence including finding, for a tile of pixels, a list of primitives that could affect the color of those pixels in the tile indicated to be important. The media may include said sequence including traversing primitives against the hierarchical tree of the hierarchical importance map. The media may include said sequence including traversing to a child node if the primitive overlaps a spatial extent of a child node. The media may include said sequence including indicating whether there is at least one important pixel in a sub-tree of the child node. The media may include wherein overlapping is determined using only addition operations. The media may include wherein, when a leaf node is reached when traversing, a pointer to that primitive is stored in the tile's primitive list. The media may include said sequence including using occlusion culling to reduce the number of primitives per tile. The media may include said sequence including processing all deferred samples within a tile simultaneously.

In another example embodiment may be an apparatus comprising a processor to develop an importance map to indicate, for each of a plurality of pixels, whether the pixel is considered important enough to be rendered, create a hierarchical tree for pixels in the map to generate a hierarchical importance map, and use the hierarchical importance map to stop traversal of a primitive that does not overlap a pixel indicated to be important, and a storage coupled to said processor. The apparatus may include said processor to find, for a tile of pixels, a list of primitives that could affect the color of those pixels in the tile indicated to be important. The apparatus may include said processor to traverse primitives against the hierarchical tree of the hierarchical importance map. The apparatus may include said processor to traverse to a child node if the primitive overlaps a spatial extent of a child node. The apparatus may include said processor to indicate whether there is at least one important pixel in a sub-tree of the child node. The apparatus may include said processor to determine overlap using only addition operations. The apparatus may include said processor to create a list of primitives overlapped for each tile. The apparatus may include a display communicatively coupled to the processor. The apparatus may include a battery coupled to the processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   developing, using a processor, an importance map to indicate, for each of a plurality of pixels, whether the pixel is considered important enough to be rendered;
   creating a hierarchical tree for pixels in the map to generate a hierarchical importance map in the processor;
   determining if a primitive overlaps a spatial extent of the child node; determining if the corresponding bit in the hierarchical importance map indicates that there is at least one important pixel in a sub-tree of the child node; and
   if said primitive is determined to overlay the spatial extent and the corresponding bit in the hierarchical important maps is determined to indicate that there is at least one important pixel, then traversing primitives down to a child node in said hierarchical tree.

2. The method of claim 1 including finding, for a tile of pixels, a list of primitives that could affect the color of those pixels in the tile indicated to be important.

3. The method of claim 2 wherein overlapping is determined using only addition operations.

4. The method of claim 3 including creating a list of primitives overlapped for each tile.

5. The method of claim 2 wherein, when a leaf node is reached when traversing, storing a pointer to that primitive in the tile's primitive list.

6. The method of claim 5 including using occlusion culling to reduce the number of primitives per tile.

7. The method of claim 2 including processing all deferred samples within a tile simultaneously.

8. The method of claim 7 including sorting deferred samples based on draw call, primitive and pixel.

9. The method of claim 7 including processing fragments within a draw call using single instruction multiple data execution.

10. One or more non-transitory computer readable media storing instructions executed by a processor to perform a sequence comprising:
    developing an importance map to indicate, for each of a plurality of pixels, whether the pixel is considered important enough to be rendered;
    creating a hierarchical tree for pixels in the map to generate a hierarchical importance map; and
    determining if a primitive overlaps a spatial extent of the child node; determining if the corresponding bit in the hierarchical importance map indicates that there is at least one important pixel in a sub-tree of the child node; and
    if said primitive is determined to overlay the spatial extent and the corresponding bit in the hierarchical important maps is determined to indicate that there is at least one important pixel, then traversing primitives down to a child node in said hierarchical tree.

11. The media of claim 10, said sequence including finding, for a tile of pixels, a list of primitives that could affect the color of those pixels in the tile indicated to be important.

12. The media of claim 11, wherein overlapping is determined using only addition operations.

13. The media of claim 11 wherein, when a leaf node is reached when traversing, a pointer to that primitive is stored in the tile's primitive list.

14. The media of claim 13, said sequence including using occlusion culling to reduce the number of primitives per tile.

15. The media of claim 11, said sequence including processing all deferred samples within a tile simultaneously.

16. An apparatus comprising:
    a processor to develop an importance map to indicate, for each of a plurality of pixels, whether the pixel is considered important enough to be rendered,
    create a hierarchical tree for pixels in the map to generate a hierarchical importance map, and
    determining if a primitive overlaps a spatial extent of the child node; determining if the corresponding bit in the hierarchical importance map indicates that there is at least one important pixel in a sub-tree of the child node; and a storage coupled to said processor; and
    if said primitive is determined to overlay the spatial extent and the corresponding bit in the hierarchical important maps is determined to indicate that there is at least one important pixel, then traversing primitives down to a child node in said hierarchical tree.

17. The apparatus of claim 16 said processor to find, for a tile of pixels, a list of primitives that could affect the color of those pixels in the tile indicated to be important.

18. The apparatus of claim 17 said processor to determine overlap using only addition operations.

19. The apparatus of claim 17 said processor to create a list of primitives overlapped for each tile.

20. The apparatus of claim 16 including a display communicatively coupled to the processor.

21. The apparatus of claim 16 including a battery coupled to the processor.

* * * * *